Nov. 5, 1929.  H. V. POINTER  1,734,272
METHOD FOR PRODUCING VENEERED CONTAINERS
Filed Feb. 23, 1926  4 Sheets-Sheet 1
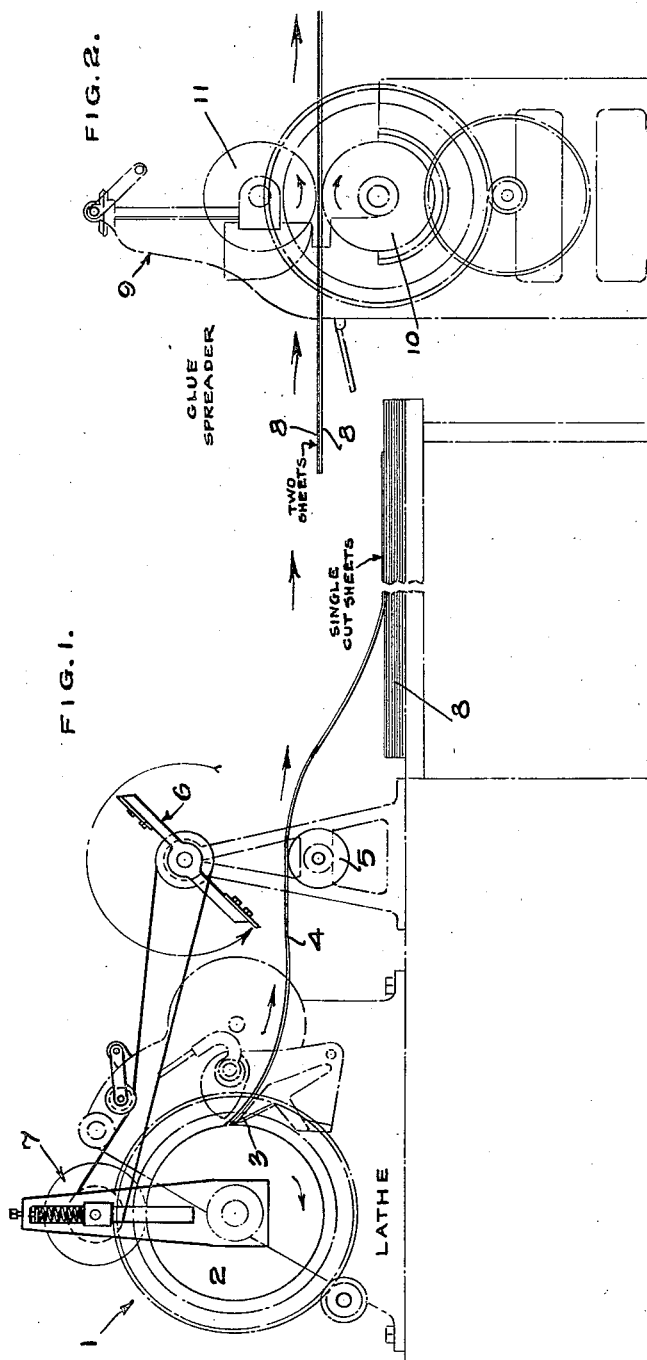
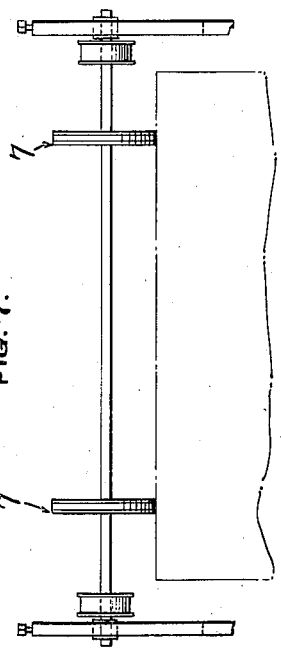
INVENTOR.
HENRY V. POINTER
BY
ATTORNEYS.

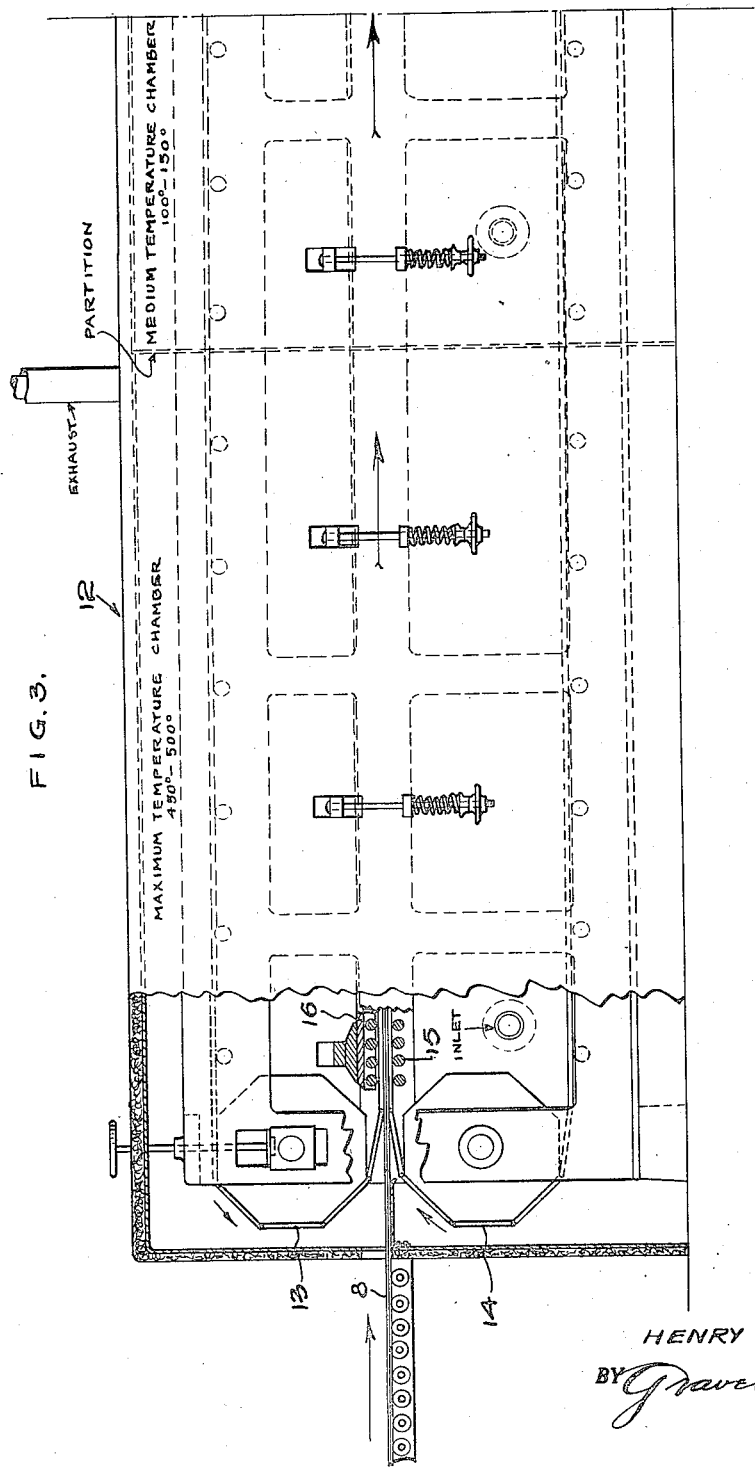

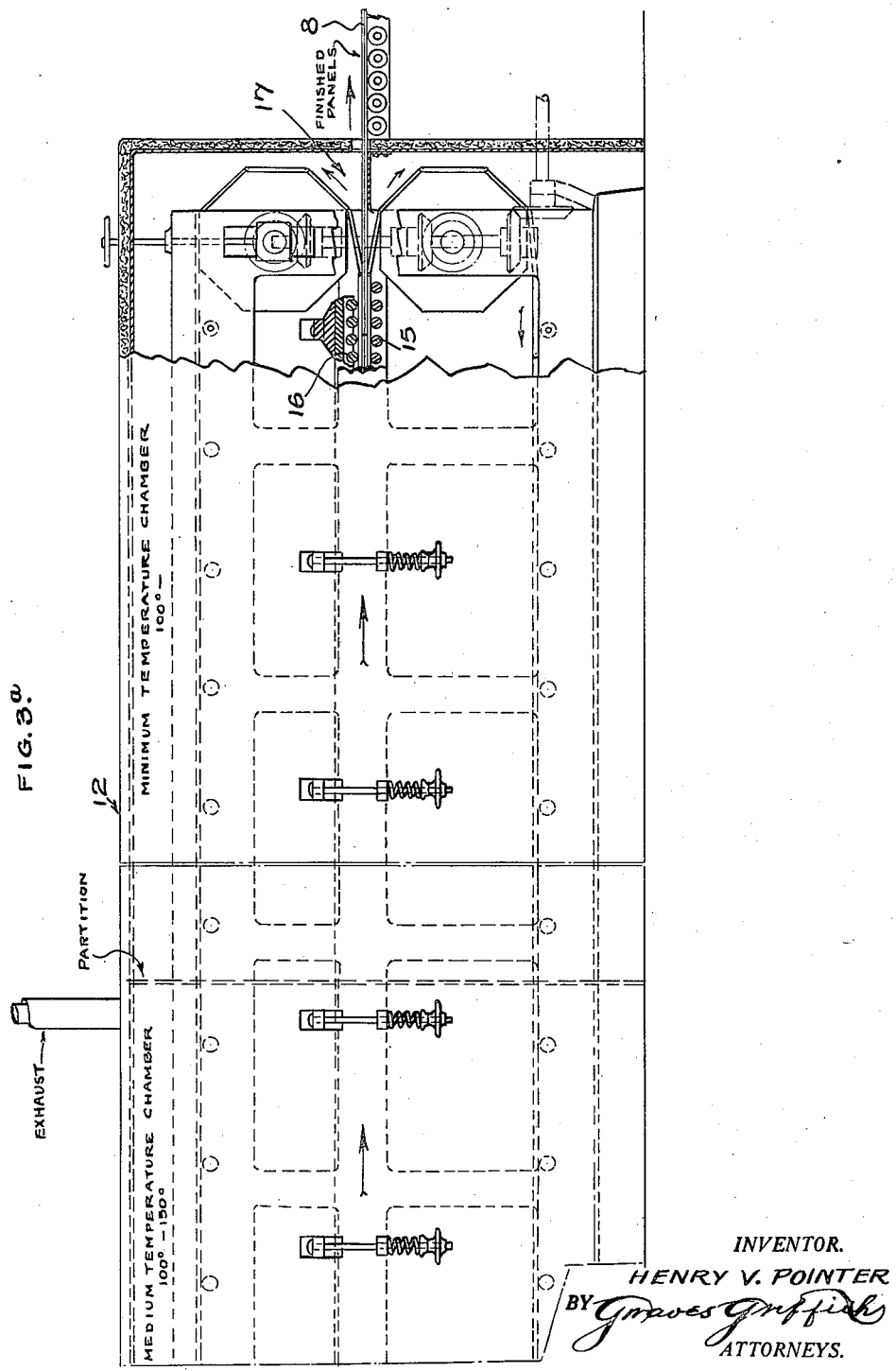

Nov. 5, 1929.   H. V. POINTER   1,734,272
METHOD FOR PRODUCING VENEERED CONTAINERS
Filed Feb. 23, 1926   4 Sheets-Sheet 4
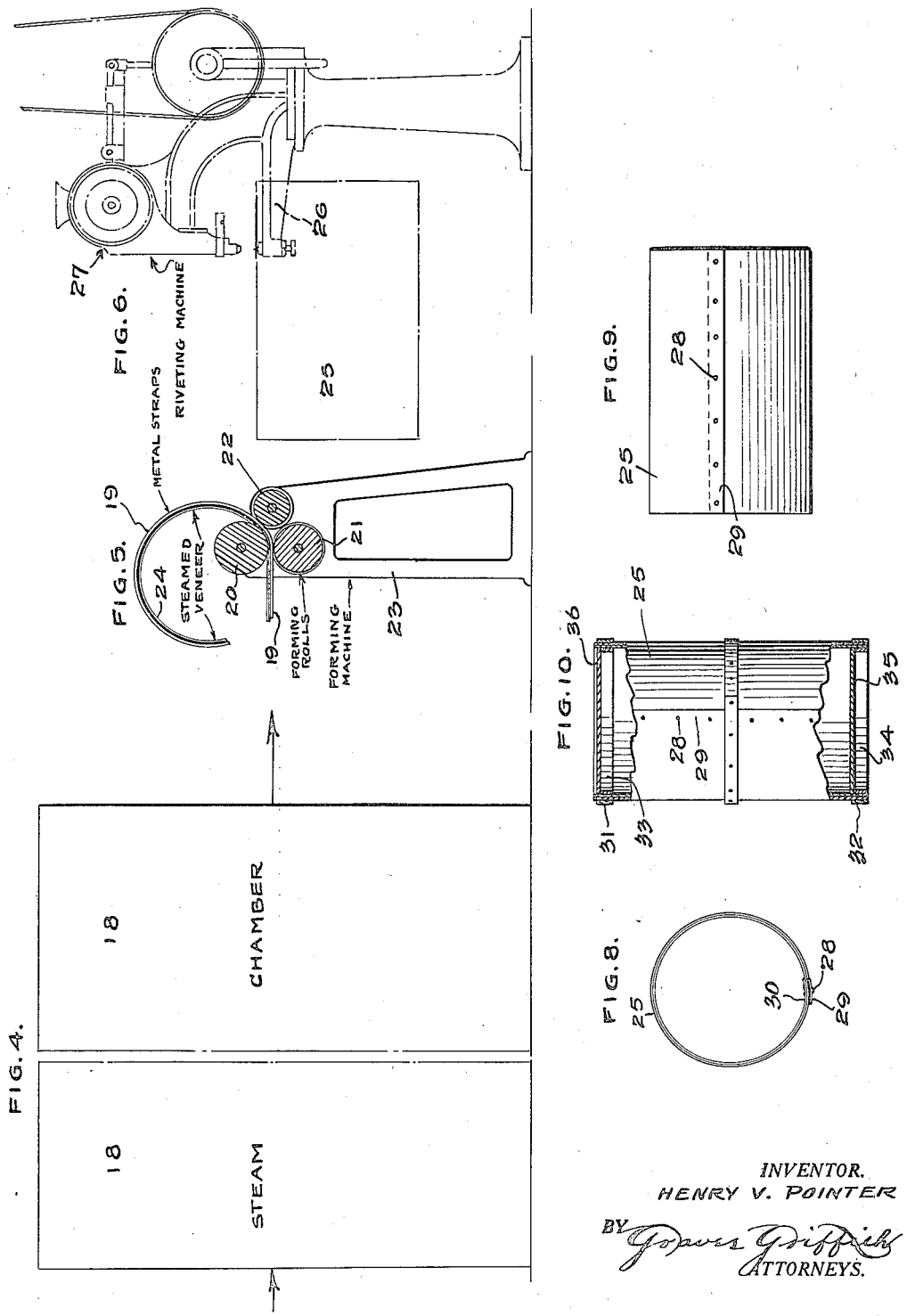
INVENTOR.
HENRY V. POINTER
ATTORNEYS.

Patented Nov. 5, 1929

1,734,272

UNITED STATES PATENT OFFICE

HENRY V. POINTER, OF SAN FRANCISCO, CALIFORNIA, ASSIGNOR TO UNIVERSAL VENEER PRODUCTS COMPANY, OF SAN FRANCISCO, CALIFORNIA, A CORPORATION OF CALIFORNIA

METHOD FOR PRODUCING VENEERED CONTAINERS

Application filed February 23, 1926. Serial No. 90,027.

The present invention relates to processes for manufacturing finished seasoned veneer products from unseasoned or green lumber, and has for its object, primarily, the provision of a continuously progressive process whereby veneer products may be expeditiously and cheaply produced.

Heretofore, in the production of veneer products of the character designated, it has been the practice, after turning the veneering from the log, to cut the veneering thus obtained into sheets and then seasoning them, after which they were passed independently through rollers to give them the necessary cylindrical form from which the ordinary two-ply drum-bodies were made by placing one without another, as a jacketing, and, with edges abutting and the seam of the one broken by the body of the other, placing hoops thereabout and securing these to the body, as thus constructed.

Illustrative of the present invention and as showing the interrelated and co-operative character and arrangement of the various mechanical elements necessary to the successful application of my process:

Figure 1 is a side elevation in dot-and-dash lines of a veneer lathe, and a rotary cutter for clipping the veneer sheets as turned out by the lathe into sections of equal length;

Figure 2 is a side elevation in dot-and-dash lines, of a glue spreader through which the clipped sections are preferably passed in pairs, receiving on their outer surfaces a coating of waterproof glue;

Figures 3 and 3ª show together a side elevation in full lines and partly sectioned, of my drying kiln, and the conveyor and pressure elements therein contained;

Figure 4 is a diagrammatic side elevation of the steam chamber in which the glued, pressed and seasoned veneer sheets are steamed preparatory to their forming-up;

Figure 5 is a diagrammatic sectional view of a forming machine for shaping or forming-up the steamed veneer sheets into the required shape;

Figure 6 is a side elevation in dot-and-dash lines, of a riveting, or stapling, machine for securing together the overlapped edges of the formed-up veneer sheet;

Figure 7 is a diagrammatic detail of the mechanism for the actuation of the clipper;

Figure 8 is an end view of a formed-up veneer sheet, with overlapped edges secured together by means of rivets or staples;

Figure 9 is a side elevation of a properly formed-up veneer sheet, showing the overlapped edges and the line of riveting, or stapling, whereby they are secured together; and Figure 10 is a view, in elevation, partly sectioned, of a completed veneer product, container of drum form, showing the overlapped riveted edges of the cylindrical body portion, the end closures and means for retaining them in place, and the reinforcing hoops encircling the body and riveted thereto.

In my improved process for making veneer products, the order of sequence for the various stages are substantially as follows:

First. The veneering is turned from the boiled or steamed log as a continuous unseasoned sheet, by means of a veneer lathe;

Second. The sheet thus obtained is cut into sections of equal length by a specially designed rotary cutter;

Third. The sections, preferably in pairs, are run through a glue-spreader, giving to the outside surfaces a coating of water-proof glue, after which there is added to each of the glue-covered surfaces an unglued section, thus forming two two-ply veneer sections;

Fourth. Carrying under pressure the two-ply sections thus formed into and through an extended artificially heated drying kiln between pressure-regulated continuously moving conveyors and discharging these multi-ply constituted sections as seasoned veneer sheets;

Fifth. Passing the thus prepared veneer sheets through a steam bath to render them pliable, preliminary to their shaping-up;

Sixth. Running the steamed and now pliable veneer sheets through forming rollers to secure the required shape; and Seventh. Overlapping the free edges of the shaped-up sheets and riveting, or stapling, these edges together to form the completed barrel or drum body.

The mechanisms employed in the accomplishment of the several steps of my substantially continuous process for the production of veneered panels or blanks consist, first, in the utilization of an ordinary veneer lathe 1, in which is secured an unseasoned log 2 of any suitable veneer timber preferably boiled or steamed, sawed to proper length and turned to smooth cylindrical form. The self-adjusting knife 3 of the lathe is set to cut a continuous sheet of material 4 from the log 2, this sheet being guided outwardly from the machine and over a wooden roller 5 of the cutting mechanism 6, this mechanism being connected to automatically compensating rollers 7 mounted for frictional contact with the log, in such manner that, as the log decreases in diameter, the cutter speed will be correspondingly decreased to maintain the proper ratio therebetween, cutting thereby the veneer 4 into pre-determined equal sections. The sections 8 thus obtained are fed in pairs through a glue-spreading machine 9 bearing fluted rollers 10 and 11 adapted to spread a waterproof casein-glue coating upon the under and upper surfaces of the pairs in their passage therethrough, after which the pairs are separated, respectively, into their individual sections, to each of which is added an unglued or plain section contacting with a glue-coated surface. The sections as now constituted are fed into the feed end of the pressing and drying kiln 12 and drawn therethrough by and between the endless conveyors 13 and 14, the upper section of the lower conveyor being adapted to travel upon a plurality of horizontally disposed rollers 15 extending from end to end of the machine, and the lower section of the upper conveyor being adapted to travel under a plurality of compression rollers 16 arranged in units and co-actively associated with the rollers 15, to normally exert the required pressure upon the conveyor sections to cause them to grip tightly the glued sections of veneer and carry these forward under pressure and at a uniform speed to the discharge end 17 of the machine, passing in transit through successive chambers of gradually diminishing temperatures, these varying from an approximate maximum of 500 degrees to an approximate minimum of 100 degrees, Fahrenheit, and thereafter discharged as perfectly glued, pressed and seasoned panels or blanks, the time consumed in transit being approximately 20 minutes but dependent upon the number of plies constituting the blank. The particular mechanism here referred to for carrying out this most important step of the process will be found more fully shown and completely described in my co-pending application, Serial No. 79,177, filed January 4th, 1926.

The panels or blanks, thus glued, pressed and seasoned, are next placed in a steam chamber 18 and steamed to render them pliable for the forming-up stage, the duration of this steaming process dependent upon the thickness and number of the plies constituting the blanks, ordinarily from fifteen minutes to one hour.

After the panels or blanks have been thoroughly steamed, they are then backed by metal straps 19 and placed between forming rolls 20, 21 and 22 of the forming machine 23, the rolls 21 and 22 thereof being grooved circumferentially to receive the straps 19, Figure 5, and the rolls set to roll the panel or blank 24 to shape, the straps 19 compelling it to take the cylindrical form, after which the straps are removed and hoops placed thereabout to cause the thus formed drum to retain its cylindrical shape 25, with its free ends in overlapped relationship. The body 25 is then placed over the arm 26 of the stitching or riveting machine 27 and stitched or riveted, as indicated at 28, along its overlapped ends 29 and 30. Two or more hoops 31 and 32 are next placed about the drum body, and liners 33 and 34 placed within the drum body adjacent the upper and lower ends thereof, then the liners 33 and 34, the hoops 31 and 32 and the drum body 25 are stitched together, or independently, as desired, after which the bottom closure 35 and the top closure 36 are placed in position and secured therein to the liners by tacks, or other means, to form the completed drum or retainer.

In producing the bulge container as shown and described in my co-pending application, Serial No. 72,878, filed December 3rd, 1925, the same process is adhered to throughout with the exception of the additional operation of goring the blanks after the completion of the rolling process as described.

The best glue, as determined from experience, for uniting the cut sections of veneer must be waterproof and of a character to resist the action of the steaming process, and the glues found to possess these qualities are the ones in which casein is employed largely as a constituent adhesive element.

I claim:

1. The method of producing a veneered container, which consists, first, of turning the unseasoned material from the log in a substantially continuous sheet, next, cutting said unseasoned material into sections of equal length and spreading a waterproof casein glue upon one surface of certain of said cut sections and applying certain other cut unglued sections thereto, and, thereafter, subjecting the said sections thus glued together to a progressively and simultaneously performed pressing and drying operation continued through a predetermined period, steaming said glued, pressed and dried sections for a predetermined time, rolling the said steamed sections to a substantially cylindrical form with their ends in overlapped relation, riveting or stapling said overlapped ends together, and, finally, applying liners, hoops and closures to the drum body, as thus formed.

2. The method of forming a veneered container, which consists of backing a seasoned and steamed blank consisting of two plys of casein glued veneer with a metallic backing and passing both backing and blank together through forming rollers, giving a substantially cylindrical form to the said backing and forcing the said steamed blank to assume a like form, and, thereafter, removing the backing from the formed blank.

3. The method of forming a veneered container, which consists of backing a seasoned and steamed blank of two ply casein glued veneer with a metallic backing and running both backing and blank together through forming rollers, rolling said backing into a substantially cylindrical shape and thereby causing the said blank to assume a like shape, and, thereafter, removing the backing from the shaped blank, and, finally, riveting the free ends of the shaped blank in overlapped relation.

4. The method of producing a veneered container, which consists, first, of turning the material from an unseasoned log, next, cutting said unseasoned material into sections of equal length and securing, at least, two of said sections together with a waterproof casein glue, subjecting said glued sections to a regulable pressure and a gradually diminishing degree of temperature throughout a predetermined course of travel to form seasoned blanks of two ply casein glued veneer and, thereafter, steaming a glued and seasoned blank thus formed, backing the said steamed blank with a metallic backing and running both backing and blank together through forming rollers, rolling said backing into a substantially cylindrical shape, thereby causing the said blank to assume a like shape, and, thereafter, removing the backing from the shaped blank and overlapping and riveting the free ends, substantially as described.

In testimony whereof I have affixed my signature.

HENRY V. POINTER.